United States Patent
DeVries

(10) Patent No.: US 8,226,750 B2
(45) Date of Patent: Jul. 24, 2012

(54) HYDROGEN PURIFIER MODULE WITH MEMBRANE SUPPORT

(75) Inventor: Peter David DeVries, Spokane, WA (US)

(73) Assignee: Genesis Fueltech, Inc., Spokane Valley, WA (US)

( * ) Notice: Subject to any disclaimer, the term of this patent is extended or adjusted under 35 U.S.C. 154(b) by 459 days.

(21) Appl. No.: 12/436,047

(22) Filed: May 5, 2009

(65) Prior Publication Data

US 2010/0282085 A1    Nov. 11, 2010

(51) Int. Cl.
*B01D 53/22* (2006.01)

(52) U.S. Cl. .............. 96/7; 96/4; 96/9; 96/11; 95/55; 95/56; 205/232; 228/195; 228/196; 228/209; 228/219; 228/254; 403/271; 403/272

(58) Field of Classification Search .......... 96/4, 7, 96/9, 11; 95/45, 55, 56; 55/523, 524, DIG. 5; 205/232; 228/193, 195, 196, 197, 209, 219, 228/226, 254; 403/265, 271, 272
See application file for complete search history.

(56) References Cited

U.S. PATENT DOCUMENTS

| 2,824,620 | A * | 2/1958 | De Rosset ................. 95/56 |
| 6,332,913 | B1 * | 12/2001 | Breitschwerdt et al. ......... 95/55 |
| 6,527,832 | B2 * | 3/2003 | Oku et al. .................. 96/4 |
| 6,582,499 | B2 * | 6/2003 | Frost et al. ................. 96/7 |
| 6,835,232 | B2 * | 12/2004 | Frost et al. ................. 95/56 |
| 7,101,421 | B2 * | 9/2006 | Edlund et al. ............... 96/11 |
| 7,168,608 | B2 * | 1/2007 | Mei ...................... 228/254 |
| 7,297,183 | B2 * | 11/2007 | Edlund et al. ............... 96/4 |
| 7,393,389 | B2 * | 7/2008 | Maus et al. ................ 96/7 |
| 2002/0083829 | A1 * | 7/2002 | Edlund et al. ............... 95/55 |

* cited by examiner

*Primary Examiner* — Jason M Greene

(57) ABSTRACT

A hydrogen purifier utilizing a hydrogen-permeable membrane to purify hydrogen from mixed gases containing hydrogen is disclosed. Improved mechanical support for the permeable membrane is described, enabling forward or reverse differential pressurization of the membrane, which further stabilizes the membrane from wrinkling upon hydrogen uptake.

9 Claims, 2 Drawing Sheets

HYDROGEN PURIFIER MODULE WITH MEMBRANE SUPPORT

This invention was made with Government support under DE-FG02-06ER84535 awarded by the Department of Energy. The Government has certain rights in this invention.

FIELD OF THE INVENTION

The present invention generally relates to a hydrogen purifier utilizing a hydrogen-permeable membrane to purify hydrogen from mixed gases containing hydrogen. A purifier module with improved mechanical support for the permeable membrane is described, enabling forward or reverse differential pressurization of the membrane.

BACKGROUND OF THE INVENTION

Hydrogen purifiers are devices that separate hydrogen from hydrogen-rich gaseous mixtures, providing a pure stream of hydrogen for a variety of uses. Typical applications include supplying hydrogen for fuel cells from reformed gases, purifying commercial grade hydrogen to provide for ultra-pure hydrogen used for semiconductor processing, supplying hydrogen for the food industry, purifying hydrogen from an electrolysis stream for laboratory uses, and many other industrial applications.

Typically hydrogen purifiers utilize a thin, hydrogen-permeable metal membrane to effectively separate hydrogen from a gaseous mixture containing hydrogen. While there are a variety of alloys, the most commonly used alloys are $Pd_{77}Ag_{23}$ and $Pd_{60}Cu_{40}$. These alloys are rolled into foils that are approximately 25 μm thick, and are then incorporated into a hydrogen purifier. Thinner foils may be used, but they are more fragile and prone to pinhole leaks, which degrades the purity of the supplied hydrogen.

A purifier may ideally operate between about 250° C. and 700° C. depending on the operating condition requirements, the material construction constraints of the purifier, and the gases introduced. For example, in a methanol steam reformer, the hydrogen rich gas produced by the reforming reaction will require a purifier operational temperature of at least about 300° C., in order to reduce the deleterious effects of carbon monoxide at the membrane surface. In other cases the reformer may use a different fuel, such as natural gas, in which the steam reforming temperature will be much higher, such as 550° C.-700° C. These different constraints will require different materials; for operation at 300-400° C. $Pd_{60}Cu_{40}$ will work well, but above about 400° C. $Pd_{77}Ag_{23}$ may be preferred due to its superior durability at higher temperatures. In either case, steam reforming with subsequent hydrogen separation utilizing a purifier will typically require a gas pressure in the range of 5-20 atmospheres on the high pressure side of the membrane for effective operation of the purifier. The permeate side pressure will vary depending on the output flux according to Sievart's law. Further, in some cases the temperature of the reformed gases must be reduced prior to their introduction to the purifier; it is generally desirable to maintain purifiers below 450° C. to prevent unwanted intermetallic diffusion between the membrane and the membrane support or seals at the perimeter. Conversely, purifiers will generally be operated above 300° C. to reduce the effects of carbon monoxide coverage (blockage) at the palladium membrane surface.

Generally, there are three basic issues which are addressed in the prior art concerning hydrogen purifiers: 1) membrane alloy selection, 2) mechanical support of the membrane, and 3) sealing of the membrane in a purification structure. In some cases the mechanical support and the sealing means are interrelated.

For example, in U.S. Pat. No. 6,183,542 Bossard discloses a foil-based hydrogen purifier where a hydrogen permeable foil, such as PdAg, is bonded between two wire mesh structures. However, the disclosure does not address supporting the structure in the event that a reverse-pressurization of the membrane occurs.

In U.S. Pat. No. 6,613,132 Bossard shows a purification module consisting of coiled tubes which are attached to a collection header. In this embodiment, the tubes are pressurized from the inside and reverse pressurization of the tubes will cause them to collapse.

In other embodiments utilizing tubes, the exterior of the tube is pressurized while the interior of the tube contains a support such as a spring to prevent collapse. While these tubes will handle a certain amount of reverse-pressurization (ballooning), the overall architecture is difficult and expensive to fabricate.

Ogawa et. al show a composite structure for hydrogen purification in U.S. Pat. No. 5,782,960. Here the inventors utilize a foil bonded or laminated to a porous metal member. In the preferred embodiment the invention utilizes plural metallic supports with rectangular openings formed by an etching process. In the invention the supports are etched prior to attachment of the membrane. The described means of bonding or laminating consists of diffusion bonding or brazing. The patent illustrates supporting the membrane when the permeate pressure is lower than the pressure across the opposing face, but does not include means to support the membrane when the permeate pressure is higher.

A similar composite structure with a palladium-alloy integrated with a support screen is illustrated in U.S. Pat. No. 7,144,444 with Takatani et. al. No contemplation is provided for supporting the membrane in the event that it is reverse-pressurized.

In US 2003/0033933, Frost and B. Krueger pursue the patenting process with the membrane separator of Allegheny Technologies. In this and in preceding patents a hydrogen-permeable foil is disposed over a disc with a seal at the center and periphery (formed by welding), where the mechanical support of the membrane is accomplished with the use of a metal mesh. In this particular patent application Frost and Krueger further add a coating over the wire mesh of a nitride, oxide, boride, silicide, carbide, or aluminide to prevent intermetallic diffusion between the mesh and the membrane. The interdiffusion of iron and other elements is known to reduce the hydrogen permeability of the palladium alloy membrane, which as claimed by the inventors is blocked by the coatings. Similar architectures are also disclosed in U.S. Pat. No. 6,602,325, U.S. Pat. Nos. 6,835,232, and 6,582,499, with none of the architectures supporting the membrane in a reverse-pressurization mode.

Juda et. al in U.S. Pat. No. 5,904,754 disclose a perimeter seal with a PdCu membrane, utilizing diffusion bonding with a copper-surfaced metallic frame. However, the disclosure does not illustrate an architecture which supports the membrane in either axis adequately.

In U.S. Pat. No. 7,101,421 Edlund et. al disclose a purifier module. In the embodiments described, a planar membrane resides on a screen support while the hydrogen-containing mixed gas travels across the membrane in a plenum formed by a feed plate/gasket. In the event that the membranes are reverse-pressurized, they will not be supported. In addition, the description does not prevent wrinkling of the membrane as it expands on hydrogen uptake, which can lead to leakage.

Finally, in U.S. Pat. No. 6,183,543, Buxbaum shows a planar membrane with mechanical support on both the mixed gas and permeate sides. However, this embodiment has several weaknesses. First, the design uses perimeter plates with inserted porous elements for supporting the membrane. Since the inserted porous elements will not be an exact fit, there will exist a gap between the perimeter plates and the elements, into which a hydrogen permeable membrane may wrinkle as the foil expands on hydrogen uptake. Further, the edges of the porous elements may in some instances be sharp (as in the case of woven metal screens), which will tend to perforate the membrane at the edges. Therefore, while Buxbaum's design will support the membrane with forward or reverse pressurization, the membrane is likely to fail eventually because it is not supported across the inevitable gap between the perimeter plate and porous supports.

While all of the above examples allow for the fabrication of membrane purifiers, none of them prevents membrane wrinkling on hydrogen uptake while protecting the membrane during reverse-pressurization, and allowing for low-cost manufacturability and simplified sealing. Therefore, an improved architecture is needed.

SUMMARY OF THE INVENTION

The present invention relates to physically supporting a membrane in a purifier by first bonding the membrane on both sides to a support structure, and then placing the bonded assembly into a purifier element which supports the membrane with both reverse or forward-pressurization. The support structure prevents the membrane from wrinkling upon hydrogen uptake, which improves the durability of the membrane. In some embodiments the structure can utilize transient liquid-phase bonding to form a seal.

BRIEF DESCRIPTION OF THE DRAWINGS

The above and other objects, features, and advantages of the present invention will become more apparent from the following detailed description taken with respect to the accompanying drawings in which.

DETAILED DESCRIPTION OF THE PREFERRED EMBODIMENT OF THE INVENTION

Figure 1:
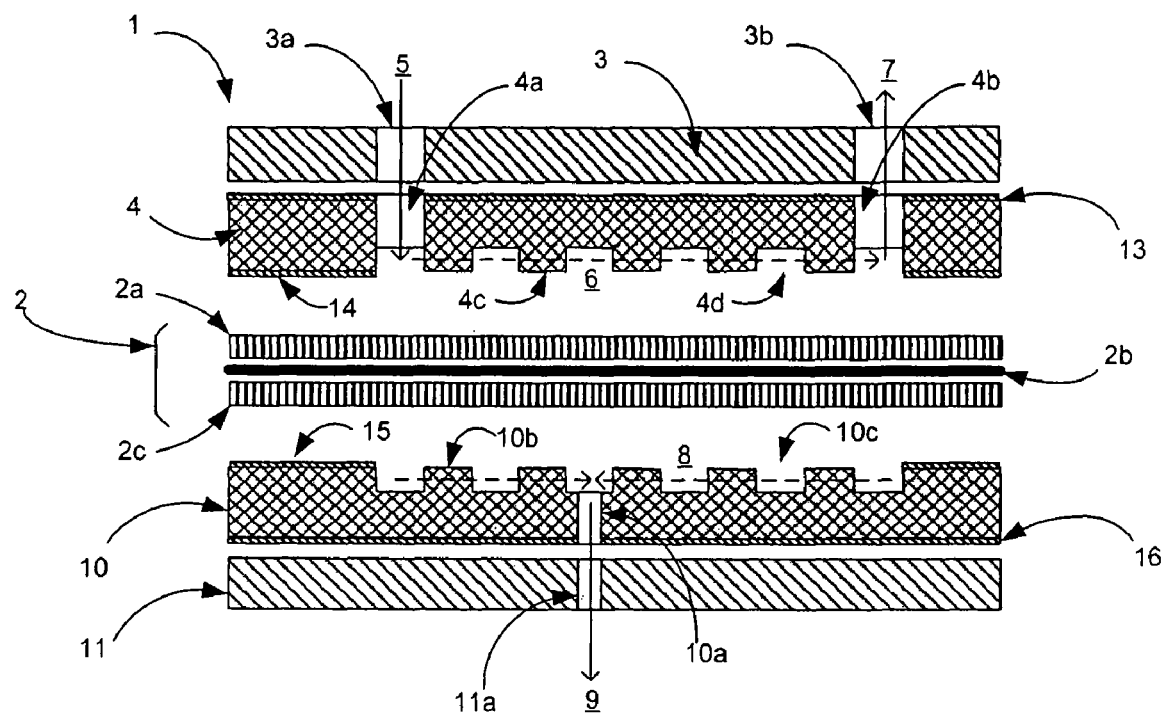
FIG. 1 illustrates the various parts comprising a hydrogen purifier element.

Referring to the drawings, a general illustration of hydrogen purifier element parts, prior to assembly, as applied to the present invention is shown in FIG. 1. Purifier element 1 has a membrane structure 2 comprising hydrogen permeable membrane 2b placed between upper support screen 2a and lower support screen 2c. Membrane structure 2 is preferably diffusion bonded to form an integral structure, but may also be joined by cladding, frictional welding, brazing, and other means known to those skilled in the art. Upper support screen 2a and lower support screen 2c are ideally formed by selective chemical etching of 304 stainless steel sheets, and may also be plated with elements such as copper, gold or silver to facilitate diffusion bonding with the hydrogen permeable membrane 2b. Hydrogen permeable membrane 2b may be a conventional alloy such as Pd—Cu or Pd—Ag, but is not limited to any particular alloy, or layers of alloys or elements such as palladium-coated refractory alloys.

Upper support screen 2a and lower support screen 2c can have any desired pattern, but the preferred embodiment utilizes a staggered hole pattern with hole diameters 1.2 times the screen thickness. A 125 micron thick stainless steel screen would therefore have staggered holes approximately 150 microns in diameter. The open areas of upper support screen 2a and lower support screen 2c are maximized to allow for as much hydrogen flux through hydrogen permeable membrane 2b; a typical open area that can be achieved via chemical etching is about 75%. Sealing areas at the perimeter of upper support screen 2a and lower support screen 2c typically do not have any etched openings, unless a passageway for gases is required.

Membrane structure 2 is sandwiched between raffinate plate 4 on the upper side and hydrogen collector plate 10 on the lower side. These parts in turn may be sandwiched between upper end plate 3 and lower end plate 11, respectively.

Raffinate plate 4 is preferably formed by selective photochemical etching of 304 stainless steel, to form raffinate plate etched section 4d. This leaves unetched features such as raffinate plate pillars 4c, which support upper support screen 2a in the event that membrane structure 2 is reverse pressurized. Although pillars are utilized in the preferred embodiment, various features may be employed to mechanically stabilize upper support screen 2a, such patterns with periodic troughs and the like. The design is not limited to any particular pattern, as many variations can be devised by those skilled in the art.

Hydrogen rich mixed gas 5 enters raffinate plate etched section 4d through raffinate plate inlet port 4a. Mixed gas 5 then travels across the face of membrane structure 2 as transferring gas 6 through raffinate plate etched section 4d until it exits raffinate plate 4 through mixed gas exit port 4b. As transferring gas 6 travels past membrane structure 2 it is effective to provide hydrogen for permeation through membrane structure 2.

Hydrogen collector plate 10 is preferably formed by selective photochemical etching of 304 stainless steel, to form hydrogen collector plate etched section 10c. This leaves unetched features such as hydrogen collector plate pillars 10b, which support lower support screen 2c during normal pressurization of membrane structure 2. Although pillars are utilized in the preferred embodiment, various features may be employed to mechanically stabilize lower support screen 2c, such as patterns with periodic troughs and the like.

During operation of the purifier hydrogen will permeate through membrane structure 2. Permeated hydrogen 8 will travel through hydrogen collector plate etched section 10c to arrive at hydrogen collector permeate exit 10a.

Upper end plate 3 is positioned so that upper end plate inlet port 3a lines up with raffinate plate inlet port 4a, so that hydrogen rich mixed gas 5 can enter purifier element 1. Likewise, upper end plate exit port 3b lines up with raffinate plate exit port 4b so that hydrogen depleted gas 7 can exit purifier element 1. Also, in similar fashion lower end plate 11 is positioned so that lower end plate hydrogen exit port 11a lines up with hydrogen collector permeate exit 10a, facilitating the exit of permeated hydrogen 9 from purifier element 1.

To facilitate sealing of purifier element 1 upon construction it is often useful to plate or coat some of the parts. This is illustrate as raffinate plate plating layer 13 on raffinate plate 4, and raffinate plate plating layer 14 on the opposing face of raffinate plate 4. As illustrated in FIG. 1, raffinate plate plating layer 14 is shown as a perimeter plating leaving features such as raffinate plate pillars 4c without a plating; this may be accomplished for example by utilizing a plating mask during the plating process. Hydrogen collector plate plating layer 15 may similarly be formed as a perimeter plated area by utilizing a plating mask. Hydrogen collector plate plating layer 16 is also preferably formed during this process. Upper support screen 2a and lower support screen 2c may also have one or more plating layers (not shown).

Figure 2:
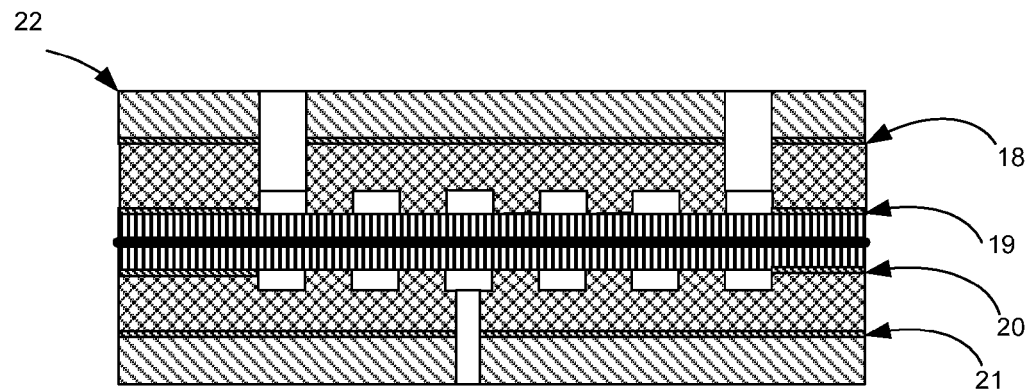
FIG. 2 shows a fully bonded purifier element

Upon compression in a heated, reducing environment, parts for purifier element 1 in FIG. 1 are joined together to form joined purifier element 22, shown in FIG. 2. Plated areas then will form a seal by joining with adjacent metallic parts via diffusion bonding, or more preferably, by transient liquid phase diffusion bonding, forming upper end plate—raffinate plate intermetallic seal 18, raffinate plate—upper screen intermetallic seal 19, lower screen—hydrogen collector plate intermetallic seal 20, and hydrogen collector—lower end plate intermetallic seal 21. Compression is preferably accomplished using a compression fixture with a compliant surface such as graphite foil (not shown). Purifier elements may be bonded together in groups, or individually, for placement into a multi-element purifier module. In such cases the routing of the inlet and exit gases, as well as the permeating hydrogen, will need to accommodate the stacking of multiple purifier elements, which is done by routing the gas inlets and exits to the side of the purifier, which is not illustrated for the sake of simplicity.

Figure 3:
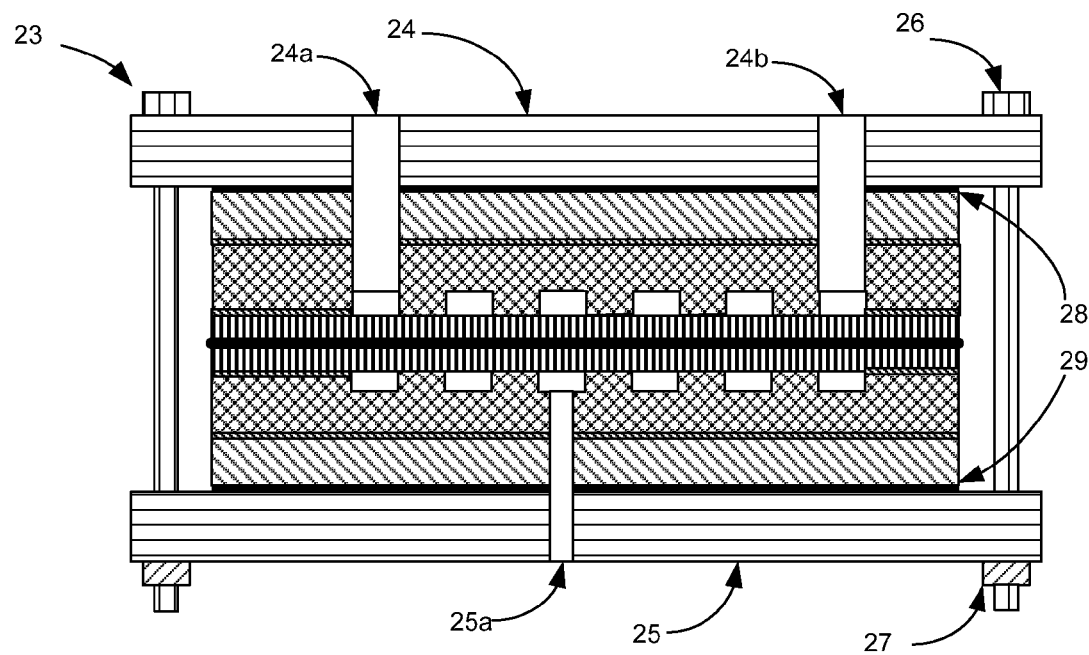
FIG. 3 shows a purifier module containing a bonded purifier element

More preferably, the parts for purifier element 1 in FIG. 1 are arranged between upper compression plate 24 and lower compression plate 25, shown in FIG. 3. Upper compliant gasket 28 and lower compliant gasket 29 distribute the force exerted by upper compression plate 24 and lower compression plate 25 more evenly, while also providing a seal for hydrogen rich inlet gas port 24a, hydrogen depleted exit gas port 24b, and permeated hydrogen exit port 25a. Compression bolts 26 are secured by nuts 27 to apply the compressive force.

Once the parts shown in FIG. 3 are secured and compressed, the assembly may be placed into a reducing heated furnace to form a fully bonded and sealed purifier module 23. This therefore eliminates a separate step of forming joined purifier element 22 with a dedicated bonding fixture.

Although the illustrations show a single element purifier module, multiple elements may be arranged to form a purifier module with additional hydrogen output capacity. Each purifier element may be oriented in the same fashion, or purifier elements may be matched in back-to-back in pairs, where the hydrogen collector plates are facing each other. In all instances, compression force is exerted through the device via the pillars, maintaining the membrane in supported mode regardless of the orientation of the pressurization.

EXAMPLE 1

A hydrogen collector plate was fabricated out of 0.8 mm 304 stainless steel by photochemical etching. An etched hydrogen collection cavity was formed with periodic pillars remaining in the cavity, 0.75 mm in diameter and spaced 1.27 mm. An unetched perimeter width of 3.2 mm was left to facilitate sealing, and gas transit vias were formed to transfer permeated hydrogen to a header area. The plate was then selectively masked interior of the perimeter sealing area, and the part was first plated with 6 microns of silver on a nickel strike, followed by 1 micron on tin. The masking material was then removed.

A raffinate plate was also fabricated out of 0.8 mm 304 stainless steel by photochemical etching. An etched hydrogen collection cavity was formed with periodic pillars remaining in the cavity, 0.75 mm in diameter and spaced 1.27 mm. An unetched perimeter width of 3.2 mm was left to facilitate sealing, and gas transit vias were formed to transfer permeate hydrogen to a header area. The plate was then selectively masked interior of the perimeter sealing area, and the part was first plated with 6 microns of silver on a nickel strike, followed by 1 micron on tin. The masking material was then removed. Pillars of the raffinate plate and hydrogen collector plate were in alignment so that force may be transmitted from one plate to another through the pillars as well as the perimeter sealing area, compressing the membrane screen.

Two end plates were fabricated out of 0.8 mm 304 stainless steel by photochemical etching. The end plates included vias to transmit gases to and from the hydrogen collector plate header as well as the raffinate plate header. The end plates were then plated with 6 microns of silver on a nickel strike.

A 0.1 mm thick 304 stainless steel sheet was photochemically etched with a staggered hole pattern, where the hole diameters were about 0.14 mm in diameter, while leaving a perimeter of unetched material 3.2 mm wide. The open area of the resulting screen was approximately 75%. The screen was then gold-plated (minimal to achieve coverage) over a nickel strike. The screen was subsequently diffusion bonded to a $Pd_{77}Ag_{23}$ membrane (25 microns thick, non-annealed) at 450° C. in atmospheric pressure hydrogen.

Upon bonding the membrane and screen were placed together with the hydrogen collector plate, raffinate plates, and end plates, between two gaskets of graphite foil 0.25 mm thick. The parts were then compressed between two 12.7 mm thick stainless steel plates utilizing perimeter bolts to supply compression. The assembly was then heated in a reducing environment to 550° C. for 5 hours and subsequently cooled. The resulting assembly was fully bonded and sealed, by virtue of the formation of tin-silver alloys at the sealing perimeters.

The purifier was subsequently endurance tested by heating to 400° C. and cycling hydrogen and argon gas at 4 bar on the high pressure side and allowing hydrogen pressure to cycle between 4 bar and ambient on the permeate side. The test simulated the hydrogen cycling one would expect from a startup-run-shutdown sequence of a reformer with a hydrogen purification module, for example.

The membrane was leak free for approximately 230 cycles, upon which the membrane showed some leakage of argon through the permeate side. Upon disassembly, it was apparent that sections of the membrane had delaminated from the screen and wrinkled, forming eventual leaks on cyclic swelling.

EXAMPLE 2

A purifier was fabricated as in example 1, the difference being that the $Pd_{77}Ag_{23}$ membrane was not bonded to the screen. The purifier endurance was about 260 cycles before leakage through the membrane was detected. Upon disassembly, it was found that the membrane was heavily wrinkled.

EXAMPLE 3

A purifier was fabricated as in example 1, the primary difference being that the $Pd_{77}Ag_{23}$ membrane was placed (but not diffusion bonded) between two screens which had been plated with a minimum gold coverage over a nickel strike. At about 264 cycles the leakage increased excessively. After disassembly it was determined that the membrane had wrinkled between the two screens, forcing the screen upwards in sections between the pillars of the raffinate plate. The membrane was not as wrinkled, however, as in example 2. The test shows that the screens are not able to compress the membrane sufficiently between pillar supports to suppress wrinkle formation.

EXAMPLE 4

A purifier was fabricated as in example 1, the difference being that the $Pd_{77}Ag_{23}$ membrane was diffusion bonded between two screens which had been plated with 1 micron of silver over a nickel strike. The leak rate did not become excessive until about 710 cycles. Upon disassembly, it was found that the membrane was wrinkle-free, as it was firmly bonded between the two screens. It is therefore concluded that the mechanical stabilization of the membrane has a significant favorable impact on the durability of the membrane.

EXAMPLE 5

A purifier was fabricated as in example 3, the difference being the parts were plated with indium rather than tin, and diffusion bonded at 400° C. The purifier was leak free when tested at 400° C. The purifier was then reverse-pressurized to 10 bar by applying compressed inert gas to the permeate side of the membrane. After the test, the membrane was again checked for subsequent leaks with positive pressurization of inert gas at 4 bar, but the purifier did not display any leakage through the membrane. It is concluded that the membrane in this architecture is capable of tolerating large reverse-pressurization swings, which can prevent accidental damage of the membrane in practical applications.

I claim:

1. A hydrogen purification module, comprising;
   a) An at least one hydrogen permeable membrane having two sides;
   b) An inlet gas metallic member, effective to channel a hydrogen-containing inlet gas across a first side of said hydrogen permeable membrane, where the first side is normally pressurized in operation;
   c) A hydrogen collector metallic member effective to receive permeated hydrogen gas from the second side of said hydrogen permeable membrane, where the second side is normally at a lower gas pressure than the first side;
   d) A permeate metallic support member and an inlet gas metallic support member, joined to the inlet gas side and permeate side faces of hydrogen permeable membrane, respectively, to form an integral permeating structure of the three parts, where both permeate metallic support member and inlet gas metallic support member allow for the passage of gas through their structures;
   where said inlet gas metallic member and hydrogen collector metallic members are operative to mechanically support said integral permeating structure when the differential gas pressure across integral permeating structure is either positive or negative.

2. A hydrogen purification module containing an integral permeating structure as claimed in claim 1, where the permeate metallic support member and the inlet gas metallic support members are formed by selective chemical etching to allow for the passage of gas through their structures, and where the permeate metallic support member and the inlet gas metallic support members are joined to the hydrogen permeable membrane by cold welding, friction welding, cladding, diffusion bonding, transient-liquid phase bonding, brazing, or laser welding.

3. A hydrogen purification module containing an integral permeating structure as claimed in claim 2, where the permeate metallic support member and the inlet gas metallic support members comprise an iron-containing alloy with an at least one plating or coating layer to facilitate diffusion bonding, where the plating or coating layer has a melting temperature of less than 1,500 Celsius, and the integral permeating structure is formed via diffusion bonding.

4. A hydrogen purification module containing an integral permeating structure as claimed in claim 3, where the inlet gas metallic member is formed by selective chemical etching and the collector metallic member formed by selective chemical etching are comprised of an alloy containing iron, with an at least one plating or coating layer, where the plating layer has a melting temperature of less than 1,500 Celsius.

5. A hydrogen purification module, containing one or more purification module elements, each purification element comprising:
   a) An at least one hydrogen permeable membrane having two sides;
   b) An inlet gas metallic member, effective to channel a hydrogen-containing inlet gas across a first side of said hydrogen permeable membrane, where the first side is normally pressurized in operation;
   c) A hydrogen collector metallic member effective to receive permeated hydrogen gas from the second side of said hydrogen permeable membrane, where the second side is normally at a lower gas pressure than the first side;
   d) A permeate metallic support member and an inlet gas metallic support member, joined to the inlet gas side and permeate side faces of hydrogen permeable membrane, respectively, to form an integral permeating structure of the three parts, where both permeate metallic support member and inlet gas metallic support member allow for the passage of gas through their structures;
   where said inlet gas metallic member and hydrogen collector metallic members are operative to mechanically support said integral permeating structure when the differential gas pressure across integral permeating structure is either positive or negative, and the hydrogen purification module further comprises:
   e) compressive end plates with perimeter bolts for exerting a compressive force, where inlet gas arrives into the hydrogen purification module at least one compressive end plate, and the same gas stream exits via at least one compressive end plate after passing hydrogen to the hydrogen purification membrane, and the permeated hydrogen from the hydrogen collector metallic member is channeled to at least one compressive end plate for exiting the module;
   f) an at least one compliant gasket between the compressive end plates and the at least one purification elements, operative to distribute pressure over the purification element and to form a seal where the inlet gas, exit gas, and permeated hydrogen gas are communicated to the compressive plate.

6. A hydrogen purification module as claimed in claim 5 containing a compressive seal, where the seal is formed of a material containing graphite.

7. A hydrogen purification module as claimed in claim 5, where there are multiple purification elements, and each purification element has the same overall orientation within the hydrogen purification module.

8. A hydrogen purification module as claimed in claim 5, containing multiple purification elements of an even number, where each element pair is arranged so that the hydrogen collector metallic members are proximal to each other.

9. A hydrogen purification module as claimed in claim 5, further comprising an at least one additional compressive seal containing graphite, positioned between at least one of the purification elements.

* * * * *